(No Model.) 2 Sheets—Sheet 1.
J. MOUNT & F. H. WARNOCK.
HOISTING APPARATUS.
No. 467,289. Patented Jan. 19, 1892.
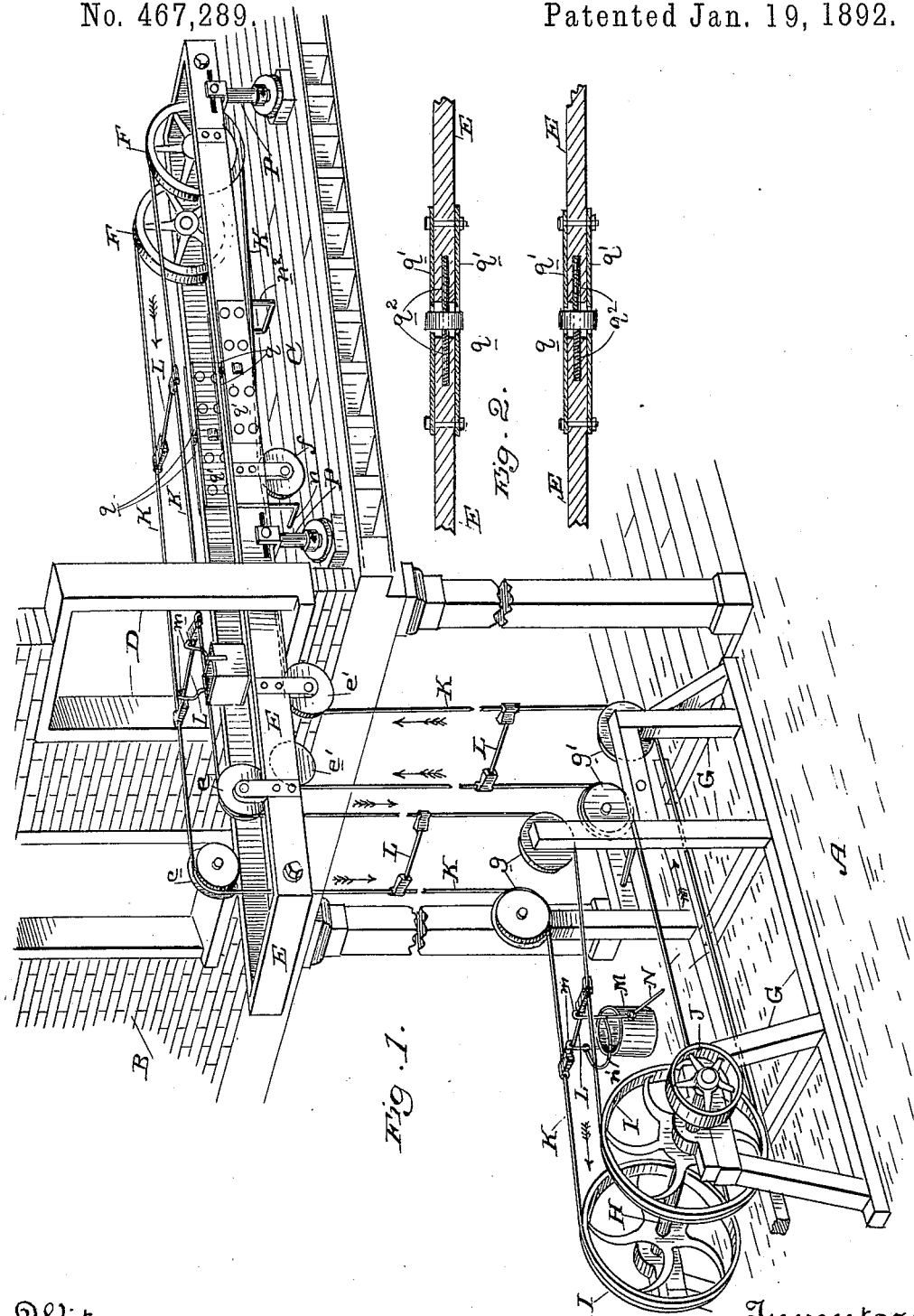

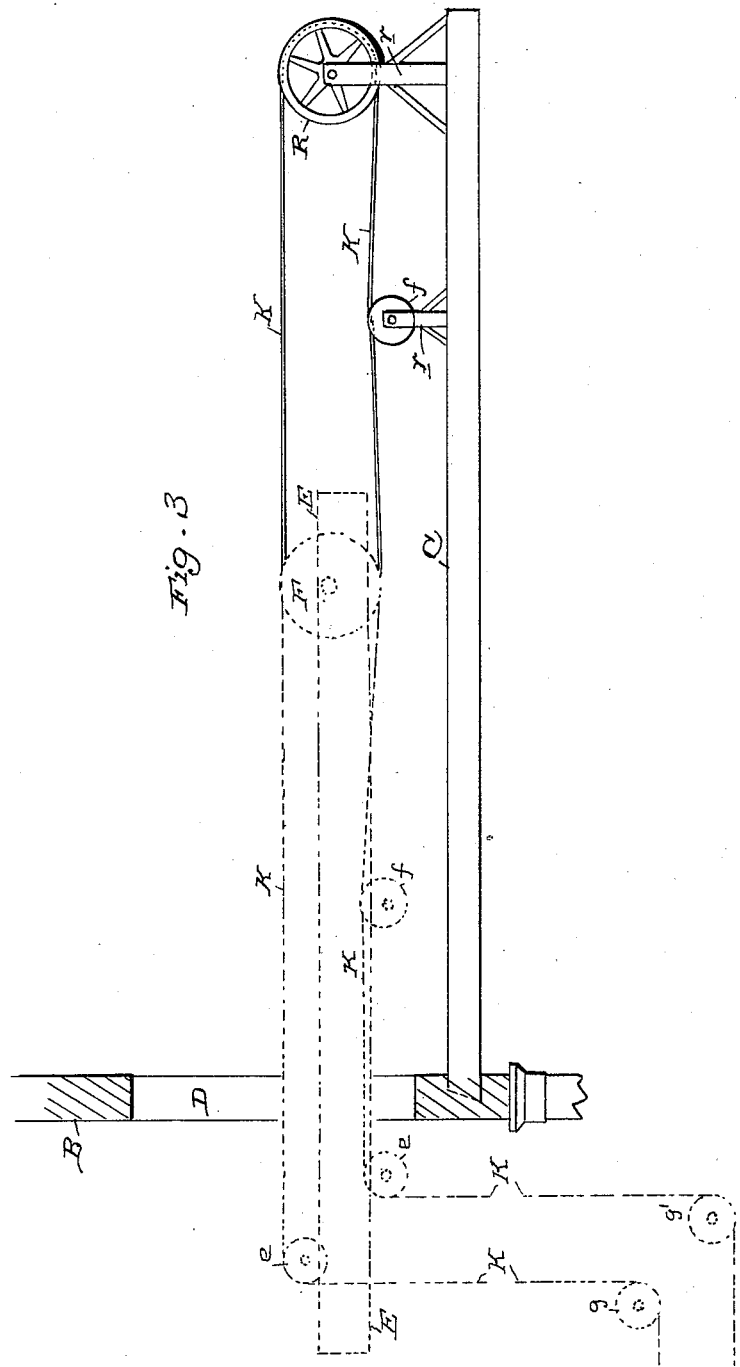

UNITED STATES PATENT OFFICE.

JOSEPH MOUNT AND FRANK H. WARNOCK, OF SPOKANE, WASHINGTON.

HOISTING APPARATUS.

SPECIFICATION forming part of Letters Patent No. 467,289, dated January 19, 1892.

Application filed July 25, 1891. Serial No. 400,763. (No model.)

*To all whom it may concern:*

Be it known that we, JOSEPH MOUNT and FRANK H. WARNOCK, citizens of the United States, residing at Spokane, Spokane county, State of Washington, have invented an Improvement in Hoisting Apparatus; and we hereby declare the following to be a full, clear, and exact description of the same.

Our invention relates to that class of hoisting or elevating mechanism in which endless traveling ropes, chains, or cables are employed and which carry the receptacles containing the material to be hoisted.

Our invention consists in the novel construction and arrangement of parts hereinafter fully described, and specifically pointed out in the claims.

The object of our invention is to provide a simple and effective means for hoisting material of any kind, but more especially for elevating brick and mortar from the ground to any of the floors of a building in process of construction.

Referring to the accompanying drawings for a more complete explanation of our invention, Figure 1 is a perspective view of our hoisting apparatus. Fig. 2 is a horizontal section of the sides of frame E, showing their adjustment. Fig. 3 is an elevation showing how the ropes, chains, or cables may be extended.

A is the ground. B is the wall of a building in process of construction, and C is one of the floors of the building, D representing a window of said floor. Supported upon this floor and projecting from the window D thereof is the beam or frame E. In the outer or projecting end of this beam or frame and on its upper portion are side pulleys $e$ and on its lower portion are side pulleys $e'$. On the inner portion of the beam or frame, which is within the building, are the end wheels or pulleys F, while any number of suitable intervening carrying-pulleys $f$ are secured to the sides of the beam or frame to support the traveling ropes, chains, or cables. On the ground or on a suitable platform on the ground is a frame G, located under the projecting end of the beam or frame E above, said frame G carrying in its upper front portion the side pulleys $g$ and in its back portion, a little below, the side pulleys $g'$.

H is a shaft upon a suitable support, said shaft carrying the main driving-wheels I and any suitable power mechanism—such as a crank or, as here shown, a pulley J—for the application of steam-power.

K are endless traveling ropes, chains, or cables. There are two of these, one on each side and parallel with each other. They pass around and under the drive-pulleys I, thence under and around the pulleys $g'$ on frame G, thence up and over the pulleys $e'$ on frame or beam E, thence to and around the end pulleys F, back from said end pulleys above the beam or frame, and down over the pulleys $e$ to and under the pulleys $g$ below, and to the drive-pulleys and points of beginning. The direction in which these ropes or cables travel is indicated by the arrows, from which it will be seen that they extend substantially horizontally from the drive-pulleys to the pulleys $g'$, thence vertically to the pulleys $e'$, and thence horizontally through the window D into the building to any point which may be desired, thence horizontally out of the building again in planes above their inward movement, thence vertically downward and approximately horizontally outward to the drive-pulleys. Secured to and between these ropes or cables at convenient distances apart are cross-bars L, from which are freely suspended the receptacles M by means of upwardly-extending side cranks or hooks $m$, to the lower ends of which the receptacles are pivoted, whereby they may swing. From the pivotal pins of these receptacles extend trip-arms N, which are adapted to come in contact with fixed bars $n$ on the frame, whereby the receptacles, which travel normally in an upright position, are tilted and their contents dumped. This tilting occurs at a point upon the floor of the building where it is desired to deposit the material.

A stop-bar $n'$ is secured to the arms or links of the receptacle and limits the tilting movement of said receptacle. These tilting receptacles are more especially for mortar.

The frame or beam E is supported on the floor by means of vertically-adjustable jacks or screws P, and it is divided into sections, as shown at $q$, fitted together by means of suitable guide-plates $q'$, and connected by extension-screws $q^2$, by the movement of which said beam or frame may be elongated or shortened up, as may be desired.

The vertical adjustment of the beam or frame due to the supporting screws or jacks P and the longitudinal adjustment due to the screws $q^2$ provide for keeping the ropes or cables taut under all circumstances.

If it be desired to carry the receptacles farther in upon the floor, it is only necessary to lengthen the ropes or cables and extend them to and about pulleys R, mounted upon movable frames $r$, set farther in at points desired.

The operation of the apparatus is as follows: When the receptacle reaches the ground under or near the drive-wheels I, it may be filled with material. Then it travels forwardly and upwardly to the floor, and thence inwardly through the window and over the floor in sufficiently close proximity thereto to prevent any injury upon the dumping out of the material, and when it reaches the contact-bar $n$ the material is dumped, as heretofore described, while the receptacle proceeds onward to the end pulleys F, and thence returns backwardly in planes above its inward movement to the outside of the building, and thence downwardly and horizontally to the point of beginning, where it may be again loaded.

The beam or frame E, instead of being projected from a window, may be projected into any vertical space, such as an elevator-shaft, adapting the ropes or cables to be extended vertically downwardly to the guide-pulleys directly underneath. When sufficient material has been carried to one floor, the frame or beam is removed and placed upon another floor and the ropes or cables extended up to it, and this may continue to any height.

Having thus described our invention, what we claim as new, and desire to secure by Letters Patent, is—

1. In a hoisting apparatus, the combination of the removable and extensible horizontal beam or frame E, mounted upon the floor of a building and having one end projecting into a vertical space, the frame G, located on the ground directly under the projecting end, the pulleys upon said frame or beam E and said frame G, the drive-pulleys below, the two endless traveling ropes or cables in the course described, the cross-bars secured thereto, and material-receptacles carried by the cross-bars, substantially as herein described.

2. In a hoisting mechanism, the combination of the beam or frame E, mounted upon jacks or screws, whereby it may be vertically adjusted, and having means for extending its length, the pulleys $e, e'$, and F, carried by said beam or frame, the frame G below the end of the beam and having the pulleys $g$ and $g'$, the drive-pulleys, the endless ropes or cables mounted upon said wheels and pulleys, as described, the cross-bars carried by said ropes or cables, and the material-receptacles carried by the cross-bars, substantially as herein described.

In witness whereof we have hereunto set our hands.

JOSEPH MOUNT.
FRANK H. WARNOCK.

Witnesses:
S. H. NOURSE,
J. A. BAYLESS.